United States Patent [19]

Wu

[11] Patent Number: 5,465,657
[45] Date of Patent: Nov. 14, 1995

[54] DEVICE FOR REMOVING OUTER MEMBRANE OF SCALLION HEAD OR GARLIC HEAD

[76] Inventor: Hsiu-Liang Wu, 58, Ma Yuan West St., Taichung, Taiwan

[21] Appl. No.: 387,121

[22] Filed: Feb. 13, 1995

[51] Int. Cl.[6] .............................. A23N 7/00; A23N 15/08
[52] U.S. Cl. .................................. 99/584; 99/516; 99/540
[58] Field of Search .............................. 99/473–476, 516, 99/534, 536–540, 546, 584–589, 591, 593–595, 574–576, 623–626, 636; 426/481–483

[56] References Cited

U.S. PATENT DOCUMENTS

| | | | |
|---|---|---|---|
| 3,126,930 | 3/1964 | Vosti et al. | 99/584 |
| 4,361,084 | 11/1982 | Raatz | 99/516 |
| 4,450,762 | 5/1984 | Lustig | 426/482 |
| 4,470,345 | 9/1984 | Miyata | 99/540 |
| 4,889,046 | 12/1989 | Cornelissen | 99/546 |
| 4,977,826 | 12/1990 | Kock et al. | 99/516 |
| 4,998,465 | 3/1991 | Fischer et al. | 99/584 |
| 5,158,011 | 10/1992 | Chen | 99/584 |

*Primary Examiner*—Timothy F. Simone

[57] ABSTRACT

A device includes a barrel for receiving objects and includes air supplied into the barrel for generating air eddy in order to disengage and to remove outer membrane from the objects. A shutter is pivotally coupled to the lower portion of the barrel for enclosing the open bottom of the barrel and for maintaining the objects within the barrel. The air eddy is supplied into the barrel from the bottom portion of the barrel for removing the outer membrane from the objects. The outer membranes may be removed without hurting the objects.

5 Claims, 4 Drawing Sheets

5,465,657

DEVICE FOR REMOVING OUTER MEMBRANE OF SCALLION HEAD OR GARLIC HEAD

BACKGROUND OF THE INVENTION

1. Field of the Invention

The present invention relates to a device, and more particularly to a device for removing outer membrane of scallion head, onion head or garlic head.

2. Description of the Prior Art

Typically, the outer membrane of scallion head, onion head or garlic head is removed manually. Some times, the garlic head or the scallion head is pressed in order to crush the garlic head body or scallion head body and in order to remove the outer membrane from the body. However, the body should be crushed.

The present invention has arisen to mitigate and/or obviate the afore-described disadvantages of the conventional methods for removing outer membrane of the scallion head, onion head or garlic head.

SUMMARY OF THE INVENTION

The primary objective of the present invention is to provide a device which may easily remove the outer membrane from the scallion head, onion head or garlic head without damaging the head body thereof.

In accordance with one aspect of the invention, there is provided a device for removing outer membrane of head members comprising a barrel including an open bottom and including a lower portion having air holes formed therein for supplying air into the barrel and for generating air eddy within the barrel, and including an upper portion for receiving the head members, and a shutter pivotally coupled to the lower portion of the barrel for enclosing the open bottom of the barrel and for maintaining the head members within the barrel. The air eddy is provided for removing the outer membrane from the head members.

The shutter is pivotally coupled to the barrel at 0 a pivot axle and includes a lever extended therefrom and arranged such that the pivot axle is located between the shutter and the lever, the shutter further includes a weight member disposed on the lever for enclosing the shutter. The shutter includes a handle secured thereto for rotating the shutter.

A casing is further disposed above the barrel and includes a lower portion having an outlet passage formed therein, a funnel is disposed above the easing for supplying the head members into the easing, the funnel includes a bottom portion having a mouth formed therein, a plug means is disposed within the casing and movable up and down between the mouth of the funnel and the outlet passage of the easing for enclosing the mouth and the outlet passage, a rod means includes an upper portion secured to the plug means and includes a lower portion for engaging with the shutter, the rod means and the plug means are moved upward to enclose the mouth when the shutter encloses the open bottom of the barrel, and the plug means and the rod means are moved downward to enclose the outlet passage when the shutter is disengaged from the open bottom of the barrel.

The rod means includes extension means extended radially outward therefrom for engaging with the barrel and for centering the rod means.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
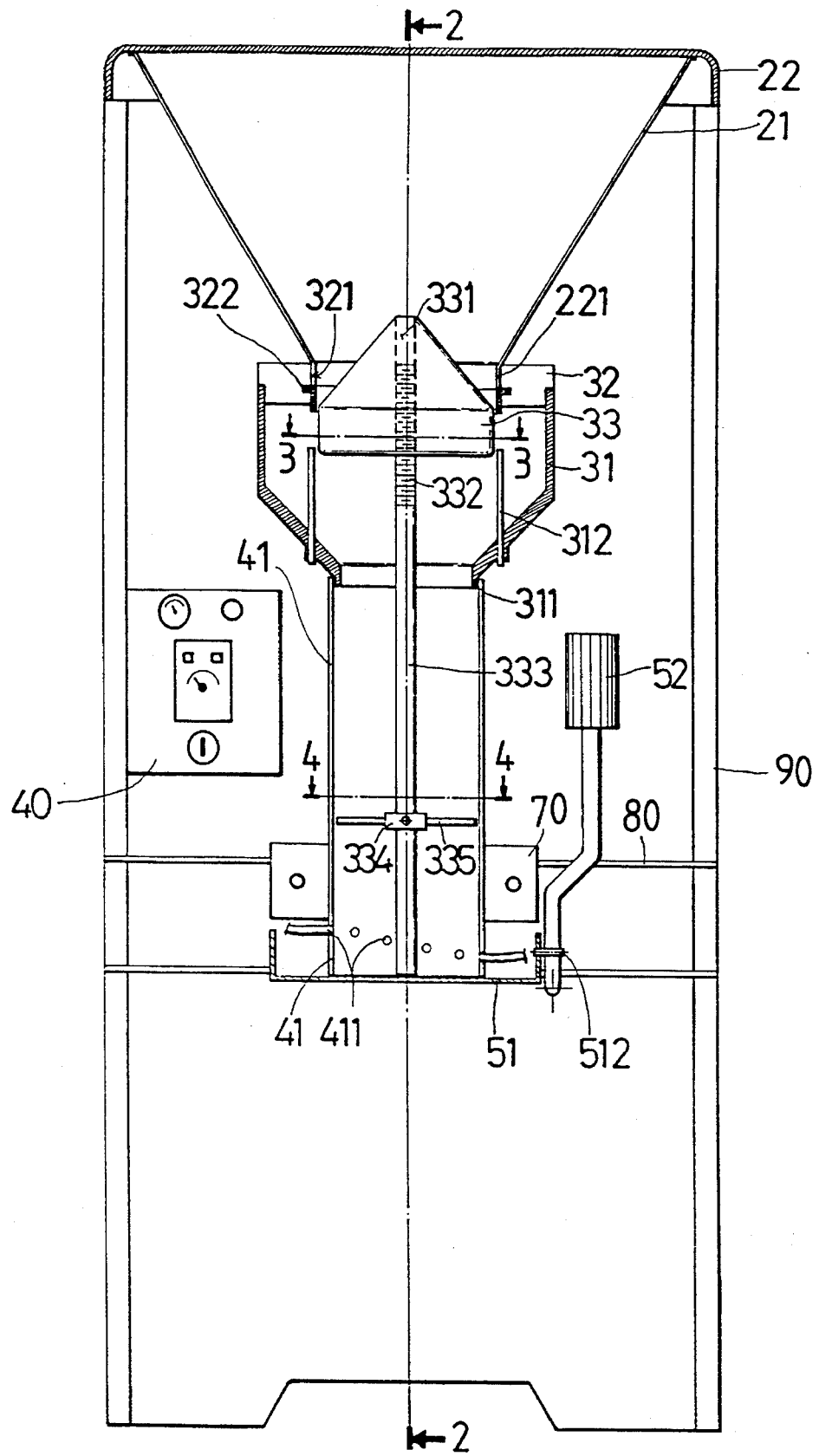
FIG. 1 is a front schematic view of a device for removing outer membrane of scallion head, onion head or garlic head in accordance with the present invention.
Figure 2:
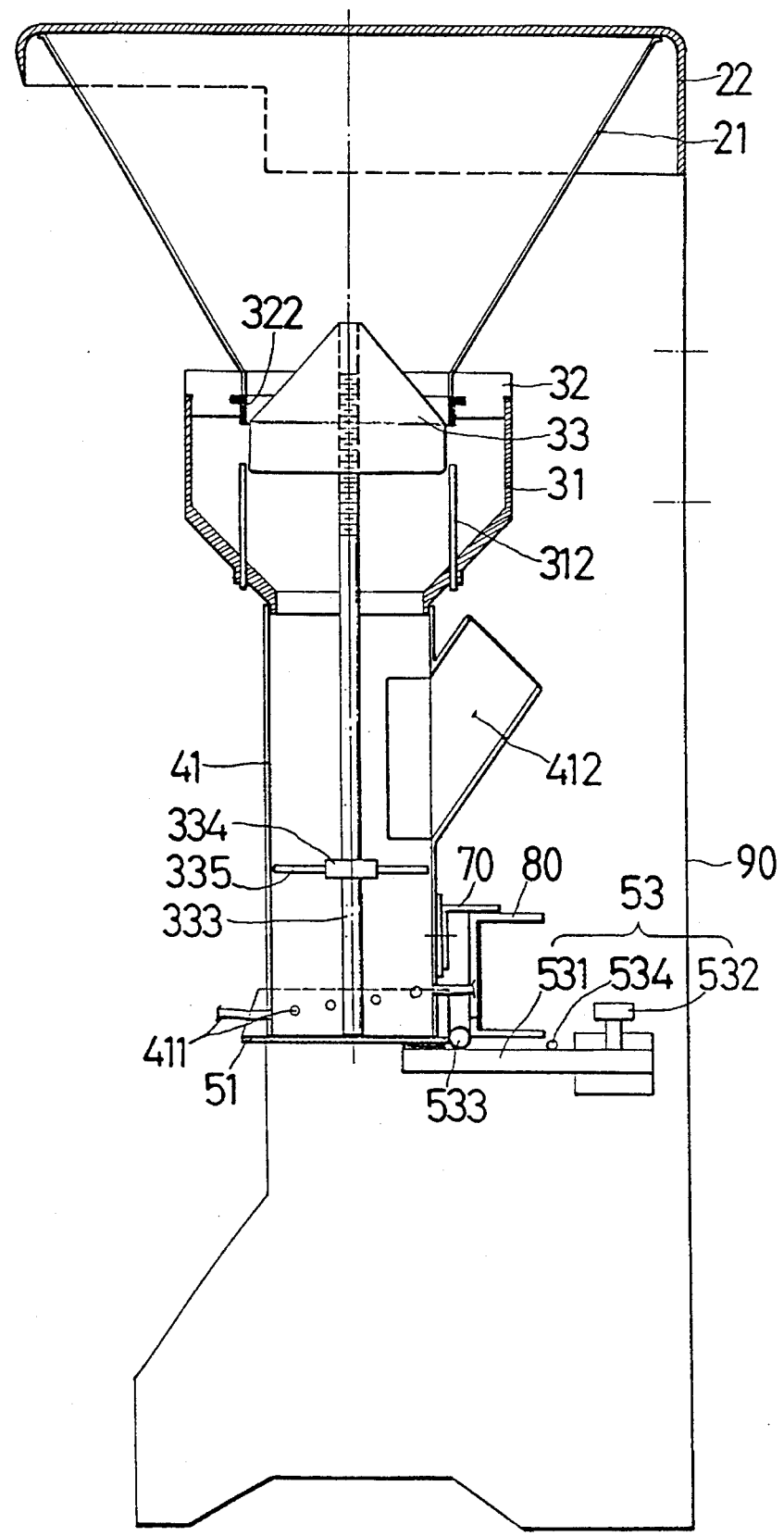
FIGS. 2, 3 and 4 are cross sectional views taken along lines 2—2, 3—3, 4—4 of FIG. 1 respectively.

Referring to the drawings, and initially to FIGS. 1 and 2, a device for removing outer membrane of scallion head, onion head or garlic head in accordance with the present invention comprises a housing 90 having supporting frames 70, 80 provided therein for supporting the elements or parts within the housing 90. The device includes a funnel 21 disposed in the upper portion for receiving scallion head, onion head or garlic head which are required to remove the outer membrane thereof. The funnel 21 includes a mouth provided in the bottom portion for outward flow of the scallion head, onion head or garlic head and includes a cover 22 provided on top thereof.

Figure 3:
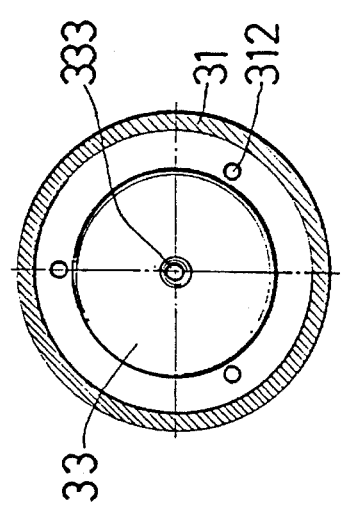
Figure 4:
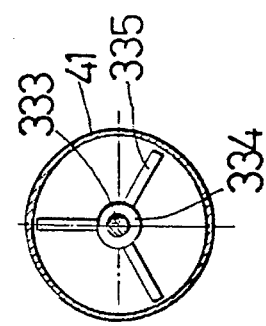

A casing 31 is disposed below the mouth of the funnel 21 and has an outlet passage 311 formed in the bottom portion. Three posts 312 are vertically provided in the inner and bottom portion of the casing 31 (FIG. 3). A annular cap member 32 includes a center opening 321 for engaging with the mouth 221 and includes a sealing ring 322 engaged therein for forming a water tight seal between the mouth 221 and the annular cap member 32. A plug member 33 is disposed below the mouth 221 of the funnel 21 and includes a cone shape having an inner thread 331 formed therein for engaging with an outer thread 332 which is formed in the upper portion of a rod 333. As shown in FIG. 4, a ring 334 is secured to the lower portion of the rod 333 and includes three extensions 335 extended radially outward therefrom.

Figure 7:
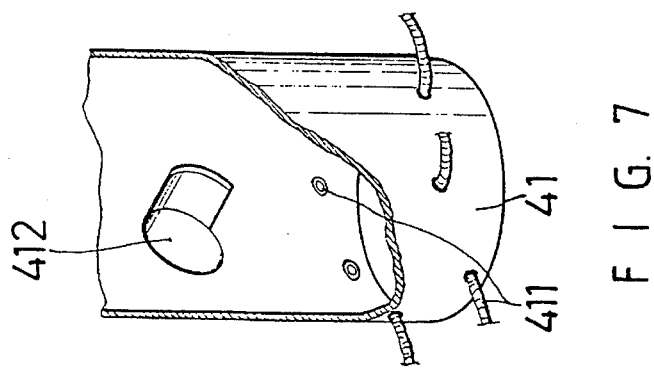
FIGS. 6 and 7 are schematic views illustrating the operation of the device.

A barrel 41 is secured on the supporting frame 70 and includes an upper portion for engaging with the outlet passage 311 of the casing 31 and for receiving the scallion head, onion head or garlic head from the casing 31. The lower portion of the rod 333 is arranged within the barrel 41 and movable up and down within the barrel 41. The extensions 335 are provided for centering the rod 333. The barrel 41 includes a lower portion having a number of air holes 411 coupling to pressurized air source by hoses so as to supply pressurized air into the barrel 41 and so as to generate air eddy within the barrel 41 for removing the outer membrane from the scallion head, onion head or garlic head. The barrel 41 further includes an outlet port 412 for allowing outward flow of the outer membrane of the scallion head, onion head or garlic head, best shown in FIGS. 2 and 7.

Figure 6:
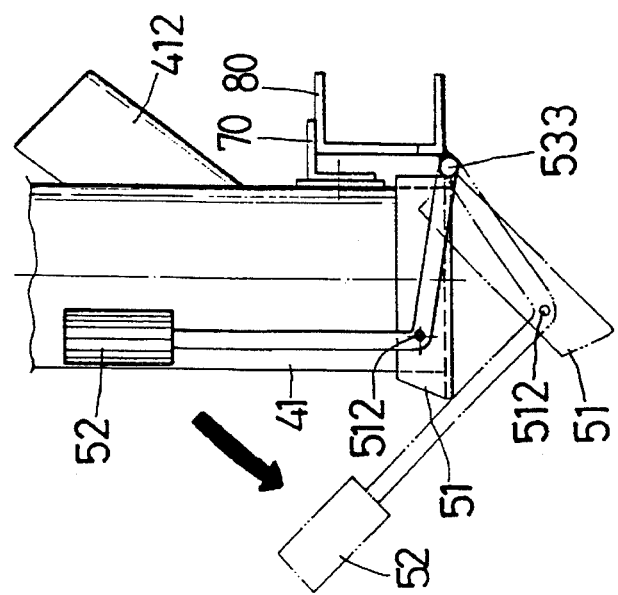
Figure 5:
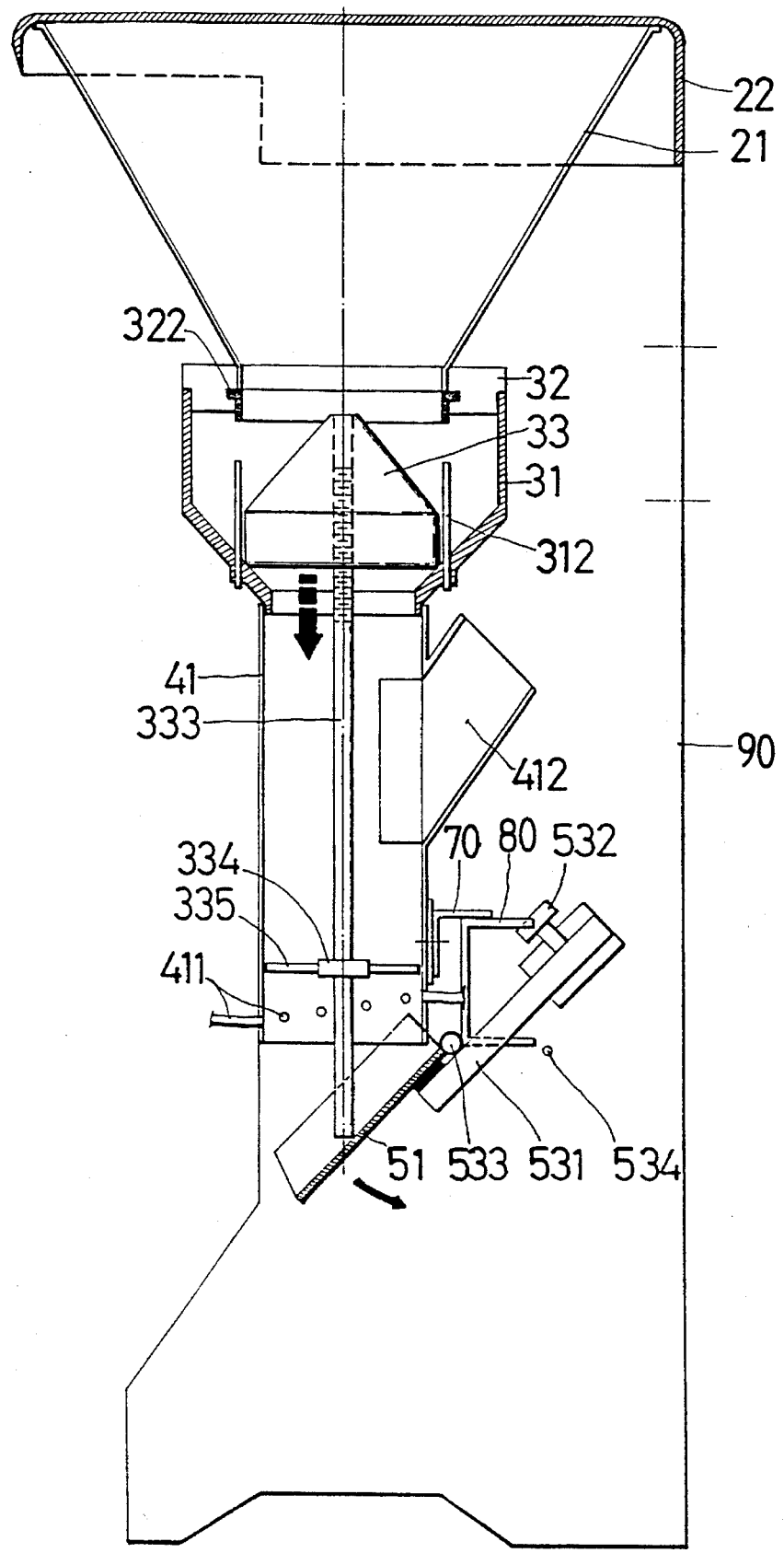
FIG. 5 is a cross sectional view similar to FIG. 2, illustrating the operation of the device.

A shutter 51 is pivotally coupled at a pivot axle 533 for enclosing the bottom of the barrel 41 and for maintaining the scallion head, onion head or garlic head within the barrel 41. A handle 52 is secured to the shutter 51 by a pin element 512 and is rotatable about the pivot axle 533 such that both the handle 52 and the shutter 51 are rotatable in concert about the pivot axle 533, best shown in FIG. 6. As best shown in FIGS. 2 and 5, a lever 531 is secured to the shutter 51 and arranged such that the pivot axle 533 is disposed between the shutter 51 and the lever 531. A weight member 532 is disposed on the free end portion of the lever 534 for balancing the shutter 51 and for causing the shutter 51 to enclose the bottom of the barrel 41. A switch 534 is disposed beside the lever 531 for engaging with the lever 531. The bottom end of the rod 333 is engaged with the shutter 51 and may be moved upward and downward by the shutter 51.

In operation, as shown in FIGS. 1, 2 and 5, in the beginning, the handle 52 is rotated in order to open the shutter 51 to the position as shown in FIG. 5. At this moment, both the rod 333 and the plug member 33 move downward until the plug member 33 is engaged with the bottom portion of the casing 31. The scallion head, onion head or garlic head received in the funnel will move downward into the casing 31 via the mouth 221 and maintained within the casing 31 by the plug member 33. The handle 52 is then rotated in opposite direction for enclosing the shutter 51 to the position as shown in FIG. 2. At this moment, the scallion head, onion head or garlic head may move downward toward the shutter The weight member 532 maintains the shutter 51 in the position as shown in FIG. 2. Pressurized air is then supplied into the barrel 41 via the air holes 411 in order to generate air eddy for removing the outer membrane from the scallion head, onion head or garlic head. The outer membrane may flow out of the barrel 41 via the outlet port 412. A timer 40 (FIG. 1) is provided for controlling the air blowing time. After blowing process, the handle 52 is rotated again in order to open the shutter 51 such that the scallion head, onion head or garlic head may be moved out of the barrel 41. When the shutter 51 is opened, the other scallion head, onion head or garlic head may move into the casing 31 when the plug member 33 is disengaged from the mouth 221. The engagement of the lever 531 with the switch 534 may control the operation of the timer 40 which may shut off the air supplying into the barrel 41.

Accordingly, device for removing the outer membrane of the scallion head, onion head or garlic head in accordance with the present invention may easily remove the outer membrane from the scallion head, onion head or garlic head without damaging the head body thereof.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A device for removing outer membrane of objects comprising:

a barrel including an open bottom and including a lower portion having air holes formed therein for supplying air into said barrel and for generating air eddy within said barrel, and including an upper portion for receiving said objects, and a shutter pivotally coupled to said lower portion of said barrel for enclosing said open bottom of said barrel and for maintaining said objects within said barrel, said air eddy being provided for removing said outer membrane from said objects.

2. A device according to claim 1, wherein said shutter is pivotally coupled to said barrel at a pivot axle and includes a lever extended therefrom and arranged such that said pivot axle is located between said shutter and said lever, said shutter further includes a weight member disposed on said lever for enclosing said shutter.

3. A device according to claim 1, wherein said shutter includes a handle secured thereto for rotating said shutter.

4. A device according to claim 1 further comprising a casing disposed above said barrel and including a lower portion having an outlet passage formed therein, a funnel disposed above said casing for supplying said objects into said casing, said funnel including a bottom portion having a mouth formed therein, a plug means disposed within said casing and movable up and down between said mouth of said funnel and said outlet passage of said casing for enclosing said mouth and said outlet passage, a rod means including an upper portion secured to said plug means and including a lower portion for engaging with said shutter, said rod means and said plug means being moved upward to enclose said mouth when said shutter encloses said open bottom of said barrel, and said plug means and said rod means being moved downward to enclose said outlet passage when said shutter is disengaged from said open bottom of said barrel.

5. A device according to claim 4, wherein said rod means includes extension means extended radially outward therefrom for engaging with said barrel and for centering said rod means.

\* \* \* \* \*